May 29, 1934.　　　　C. W. ARMBRUST　　　　1,960,431
BRAKE SHOE
Filed Dec. 21, 1931　　　6 Sheets-Sheet 1

Inventor
Charles W. Armbrust
By Jabel & Banning
Attys

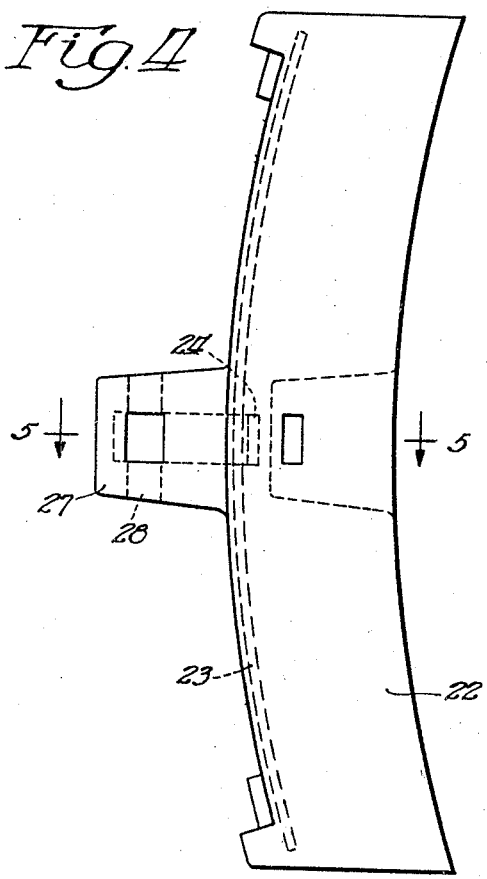
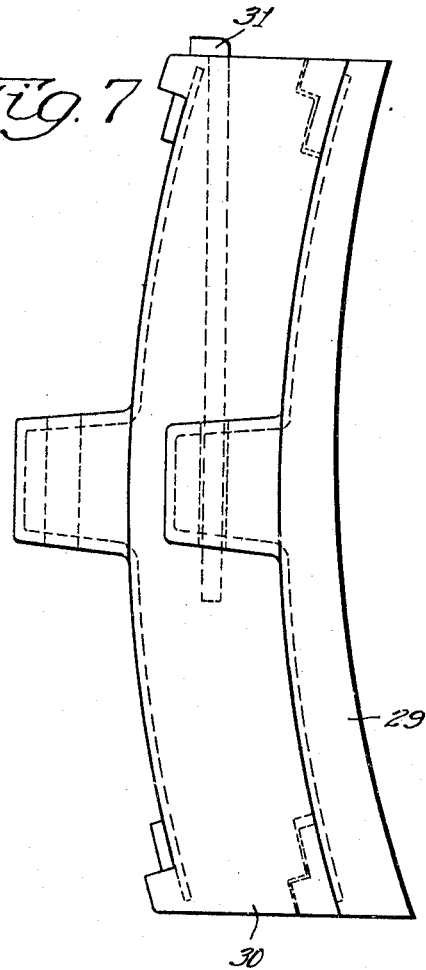
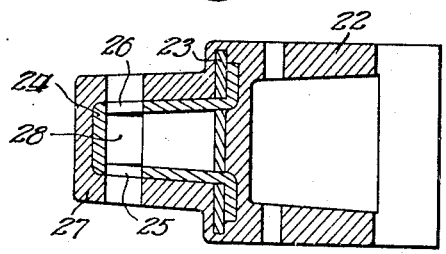
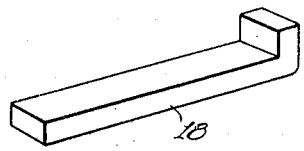

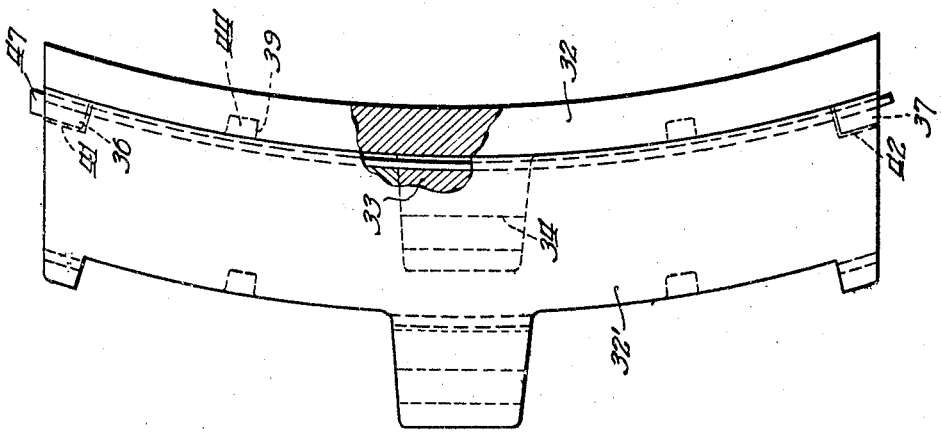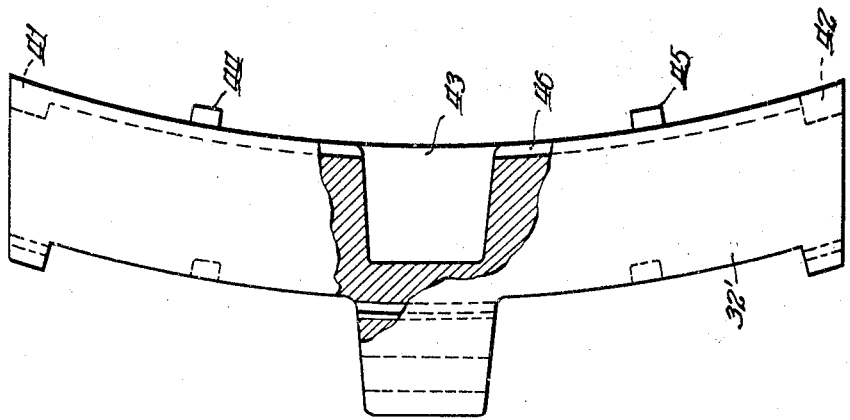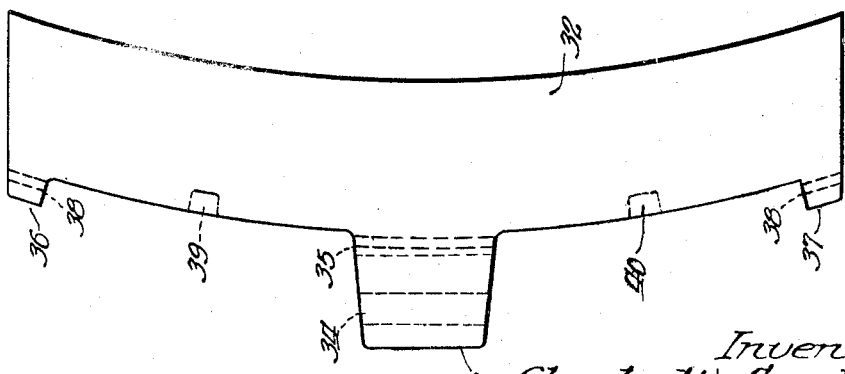

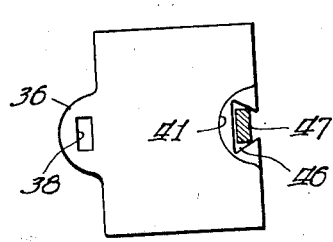
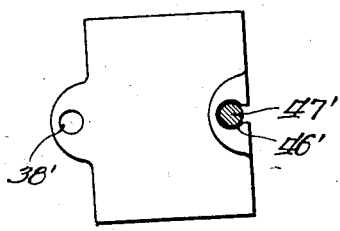
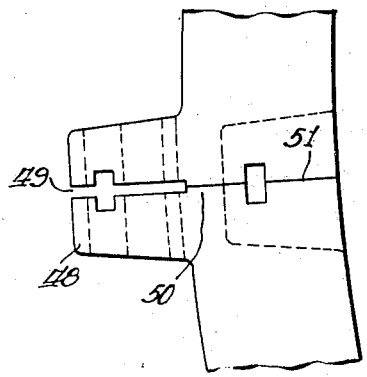
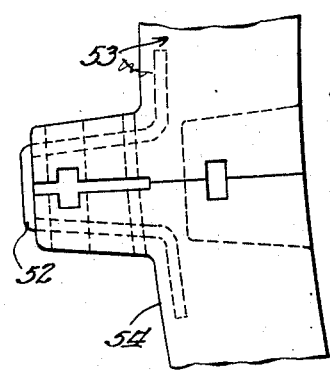
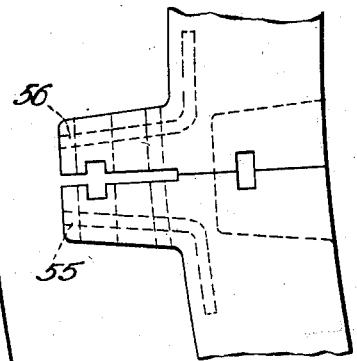
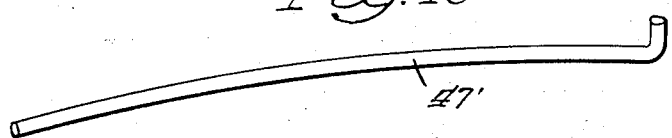

May 29, 1934.   C. W. ARMBRUST   1,960,431
BRAKE SHOE
Filed Dec. 21, 1931    6 Sheets-Sheet 5
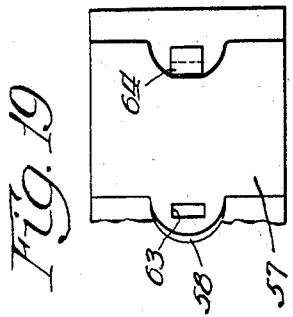
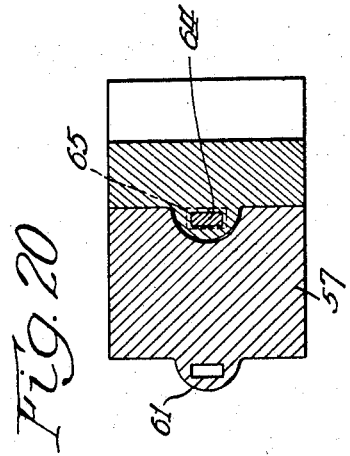
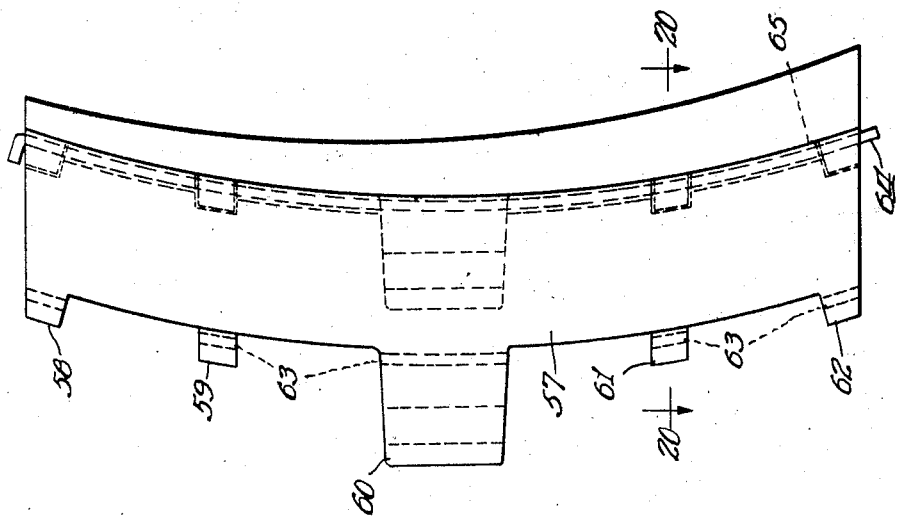
Inventor
Charles W. Armbrust May 29, 1934.  C. W. ARMBRUST  1,960,431
BRAKE SHOE
Filed Dec. 21, 1931    6 Sheets-Sheet 6
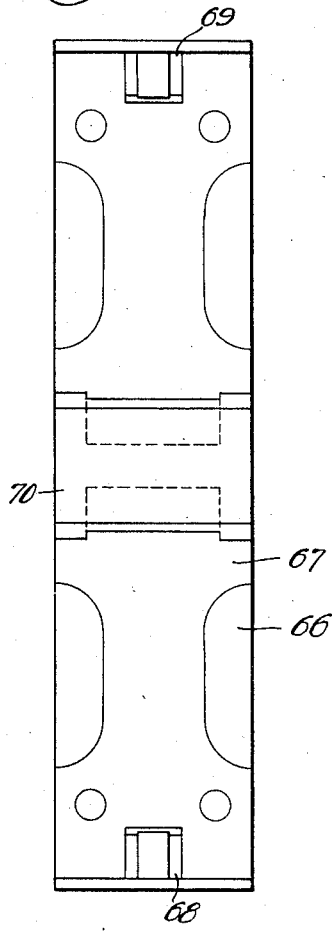
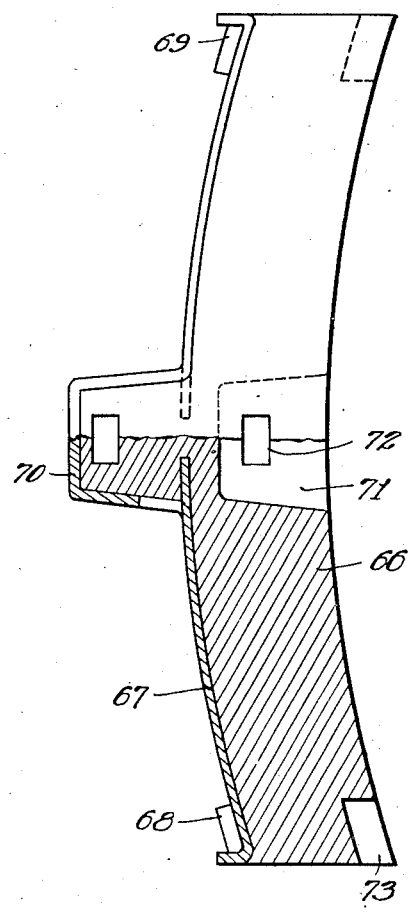
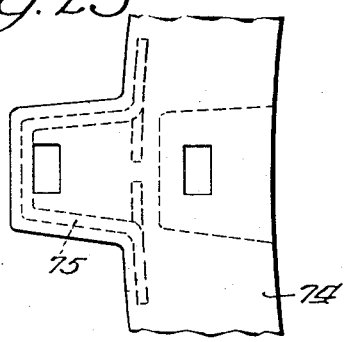
Inventor
Charles W. Armbrust
By Zabel & Banning
Atty.

Patented May 29, 1934

1,960,431

UNITED STATES PATENT OFFICE 1,960,431

BRAKE SHOE

Charles W. Armbrust, Middletown, N. Y.

Application December 21, 1931, Serial No. 582,269

9 Claims. (Cl. 188—243)

My invention relates to brake shoes for railway car brakes and the like.

The principal purpose of this invention is to provide an integral or one-piece interlocking type of brake shoe which is more economical in handling at the plant, in shipment, in service, and in construction, and which readily combines with the standard brake head in the usual manner so that a new shoe may be applied between a worn shoe and the brake head whereby the remainder of the worn shoe may be substantially used up with safety because it has the new shoe behind it ready to take up the burden when it fails, which will also be used up in turn as well as all others that follow.

My invention contemplates also a novel means of securing the shoes together and to the brake head in the usual manner which permits the shoe to be used substantially all the way to the back without impairing the securing means, and wearing it practically all out, which should eliminate brake shoe scrap piles on every railroad if this type of shoe is used, resulting in large savings.

Another object of this invention is to provide interlocking brake shoes of this character with reenforcing means capable of holding the parts together in case of cracking and breakage of the castings so as to prevent them from dropping down on the tracks and causing derailment.

It is also a purpose of this invention to provide in brake shoes of the character hereinbefore mentioned means whereby the shoes may separate centrally transversely while in service into two pieces under undue strain or when the brakes are applied, without danger of either of the pieces dropping out to obtain contact simultaneously with all the prongs of the brake head, enabling the shoe body to wear out without breaking.

Other and more specific objects and advantages of the invention will appear as the description proceeds when taken in connection with the accompanying drawings. Certain features shown herein, however, are not claimed in this application since they are made the subject matter of separate applications. It is to be understood that the illustrations and description are preferred examples only and are not to be taken as limiting the invention or the materials which constitute it except in so far as it is limited by the claims.

In the drawings—

Fig. 4 is a side view of a shoe similar to that shown in Fig. 1;

Fig. 5 is a cross section on the line 5—5 of Fig. 4;

Fig. 6 is a perspective view of a locking pin utilized with the shoes shown in Figs. 1 to 5;

Fig. 7 is a side view illustrating a different method of locking the partially worn shoe to the new shoe;

Figs. 8, 9, and 10 illustrate a form of shoe embodying a different method of mounting the shoes together when an old shoe is placed in front of a new shoe for attachment to the brake head;

Figs. 11 and 12 are end views of brake shoes such as shown in Figs. 9 and 10 illustrating the manner of locking the shoes together;

Figs. 13, 14 and 15 are fragmentary views illustrating a split shoe type of construction with a novel means of reenforcing the same;

Figs. 16 and 17 are perspective views of the interlocking pins used in the structure shown in Figs. 8 to 12;

Fig. 18 illustrates a plain cast iron shoe similar to the shoe shown in Figs. 8 to 10 but employing a slightly different method of interconnecting the shoes together;

Fig. 19 is an end view of the shoe shown in Fig. 18;

Fig. 20 is a section on the line 20—20 of Fig. 18;

Fig. 21 is a back view of a shoe having a pressed steel or malleable back in which the two end guide lugs and the central holding lug are integral parts of the back;

Fig. 22 is a side view partly in section of this structure; and

Fig. 23 is a side view illustrating a slightly modified form of this type of shoe.

Figure 1:
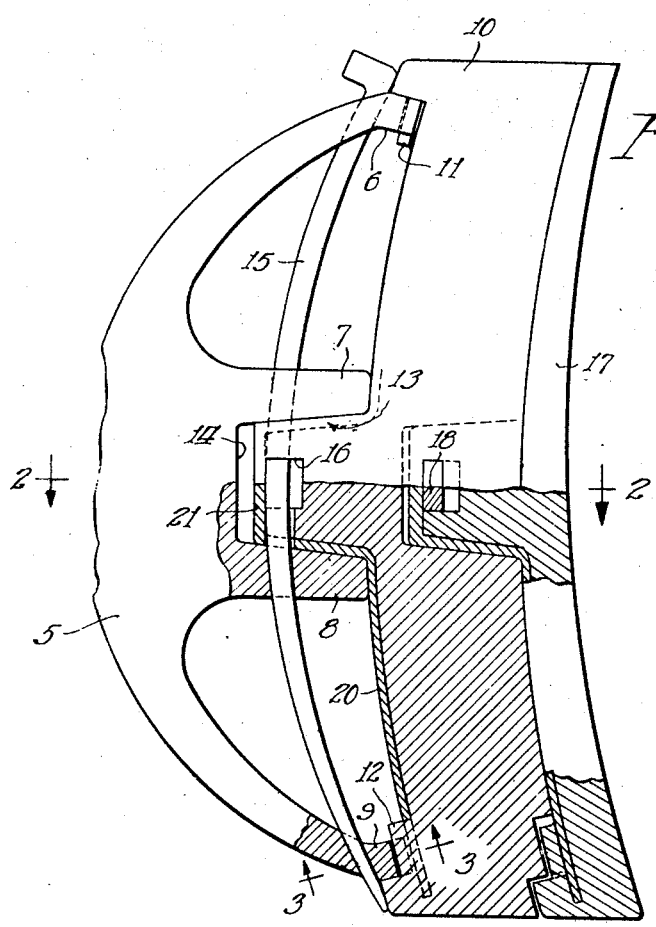
Fig. 1 is a side view partly in section of an assembled brake head, a new brake shoe, and an old brake shoe embodying my invention.

Referring now in detail to the drawings, in Fig. 1 I show at 5 a brake head having the four bearing points 6, 7, 8, and 9 which are adapted to receive the back of a shoe 10 in a well known manner. The bearing surfaces of the brake head are arranged on a curve which is substantially that of the surface of the wheel against which the brake shoe fits. The radius of the face and the back of the shoes such as 10 is also the mean radius of the wheels used with them. The reason for this is to obtain as nearly as possible an even distribution of strain throughout the structure so that the brake shoes are merely means for evenly transmitting the strain from the wheel to the brake head which is where the strain belongs. The shoe 10 has the lugs 11 and 12 at the ends thereof which are guide lugs interfitting with the corresponding ends of the brake head. In addition, the shoe 10 has a central lug on the back indicated at 13 which lug is received in the corresponding socket 14 of the brake head, the brake head and shoe being locked together by means of a pin 15 which passes through an opening provided in the top of the lug 13. There is also provided a transverse opening indicated at 16 for a purpose which will be presently explained.

The shoe 10 is provided on its front face with recesses which are complementary to the projections 11, 12, and 13 so that, if the back of one shoe is placed against the front of another shoe, the projections on the back of the shoe will just fit into the recesses on the front of the other shoe. This is illustrated clearly in Fig. 1 by the positioning of the partially worn out shoe 17 on the front of the new shoe 10, the two being locked together by a transverse pin 18 which extends through suitable openings provided in the sides of the shoe 10 (see Figs. 2 and 5) and then passes through the central aperture 16 provided in the central lug of the shoe 17. In actual service, the shoe 17 is the first one pinned to the brake head and it is used until it is worn about to the thickness shown in Fig. 1. At this time, it is removed from the brake head, and a new shoe 10 is fitted together with it with the projections on the shoe 17 entering the recesses of the new shoe 10. These two shoes are securely pinned together by means of the pin 18 (shown in Fig 2), and the two shoes pinned together to form a single unit are then pinned to the brake head as shown in Fig. 1 with the worn shoe 17 next to the tread of the wheel. The wear will then continue into the worn shoe 17 until that shoe is entirely worn out, the wear then continuing into the shoe 10 until it is in turn worn to about the thickness of shoe 17 as shown in Fig. 1. The replacement of shoe 10 by another new shoe and the pinning of shoe 10 to the front face of the new shoe again fits the brake head up for another period of use.

This replacement may be continued indefinitely, and it is believed to be clear that the shoes are practically worn out, the only unworn portions being the tips of the lugs 11 and 12 and 13 and the head of the pin 18 which secures the shoes together. If it is desired to preserve the pin 18 for future use, it could be removed when the wear in shoe 10 approaches close to this pin. In either event, the parts described would be a matter of ounces instead of a number of pounds resulting from the present used shoe.

Figure 3:
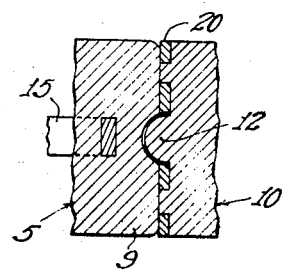
Fig. 3 is a section on the line 3—3 of Fig. 1.
Figure 2:
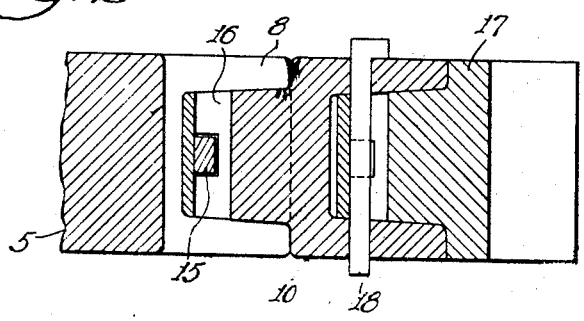
Fig. 2 is a section on the line 2—2 of Fig. 1.

The shoes shown in Figs. 1, 2, and 3 have a steel back 20 molded therein, this back extending substantially the full length of the shoe and extending over the top of the lug 13 as indicated most clearly at 21 so as to reenforce the central lug 13. This steel reenforcing makes the shoe much safer owing to the fact that the steel prevents the breakage of parts of the shoe that might fall down on the track and derail a car. The construction of this shoe with the steel back cast into it and with the radius of the face the same as that of the back and this radius, being the mean radius of both, the tread of the wheel and the four contacts of the brake head, takes the unnatural strain off the shoe when it contacts with the tread of the wheel along its face and with the brake head along the four points at its back. This prevents breakage of the parts of the shoe from the steel back and makes for a much longer life, for the shoe for the brake head and parts to which it is attached.

In Fig. 4, I show a cast iron brake shoe 22 with a steel back 23 cast into it. It has a separate steel holding lug 24 extending transversely of the shoe. The ends of this steel holding lug extend under the steel back 23 so as to form a strong connection therewith. The steel holding lug as shown has the slots 25 and 26 punched therein to engage the pin 18 such as shown in Fig. 6 so that a partially worn shoe may be pinned to a new shoe in the fashion described in connection with Fig. 1. It is obvious that the casting of the material at 27 around the member 24 may be dispensed with if desired and the steel lug itself used to hold the brake shoe in place. A keyway shown at 28 is provided for the key which secures the shoe to the brake head.

In Fig. 7, I have shown a partially worn steel back shoe 29 pinned into the face of a new shoe 30 by a pin or rod 31 extending longitudinally of the shoe. Shoes 29 and 30 are otherwise the same as the shoes shown in Fig. 1. In constructing shoes such as shown in Fig. 7, however, a core has to be used in forming a hole or seat for the entrance of pin 31, and the slots or holes through the central holding lug as shown in the other types of shoes are eliminated. The keyway for the brake shoe pin is utilized to receive the pin 31.

The brake shoes thus far shown have been cast iron shoes having steel backs integral therewith, the shoes all being of the interlocking type so that a worn shoe can be pinned into the face of a new shoe transversely and longitudinally of the shoes at their central holding lug. It is clear that the methods of securing the partially worn shoe to the face of a similar new shoe may be varied over a wide range. The forms shown, therefore, are illustrative only, and many other methods of securing the two shoes together might be used.

In Figs. 8, 9, and 10, I have shown another type of brake shoe which does not include a steel backing. These are one-piece interlocking cast iron brake shoes. In Fig. 8 I show the shoe of first application. This shoe 32 as shown is provided with a central lug 33 having the brake pin aperture 34 and the smaller aperture 35 therein. This shoe also has the two end lugs 36 and 37 which are apertured as indicated at 38. Between the central lug and each end lug, I preferably locate a pair of recesses 39 and 40.

In Fig. 9, there is shown the one-piece companion interlocking shoe having the same lugs and seats in its back as shown in Fig. 8. In its face, however, it has corresponding recesses 41 and 42 to receive the end lugs 36 and 37, a recess 43 for the central lug 33 and lugs 44 and 45 to fit into the sockets 39 and 40. Also, extending longitudinally down the face of the shoe 32' there is a groove 46 which preferably aligns with the openings 35 and 38 of a shoe such as 32 placed against the front face of the shoe 32'.

Fig. 10 shows the manner of assembling a worn out shoe 32 with a new shoe 32' by means of a pin 47. The shape of the apertures 35 and 38 may be varied as may the contour of the groove 46. This is illustrated best by reference to Figs. 11, 12, 16, and 17 where in Fig. 11 the aperture 38 is rectangular while the groove 46 is dovetail shaped to receive the pin 47. In Fig. 12, however, aperture 38' is round and the groove 46' is also shaped to receive the round pin 47' shown in Fig. 16.

These types of interlocking cast iron shoes just described could also be strengthened at their weakest point about their central holding lugs if desired by reenforcement. In the fitting of these shoes to the brake heads it is sometimes found that they are not made accurately enough to engage evenly against the four prongs of the brake head. I have found a way to overcome this without serious difficulty even in connection with interlocking shoes, and this is illustrated in Figs. 13 to 15 of this application although the broad principle thereof as applied to a plain brake shoe is claimed in another invention about to be applied for.

The construction as shown in Figs. 13 to 15 embodies a central holding lug 48 which as shown in Fig. 13 is split by a transverse groove 49, the shoe being molded together as indicated in the space 50 although deeply scored on the opposing sides of the shoe so that the shoe will break evenly and quickly at this weakest point, namely the point 50 following the scored line 51. This break may occur when the wear goes slightly into the solid portion 50 or when the engineer applies the brake several times. This construction enables the partially worn shoe as well as the new shoe behind it to break thus permitting both to always bear evenly against the four prongs of the brake head. This makes the shoes wear evenly instead of wearing as shown at 17 in Fig. 1.

In Figs. 14 and 15, I have shown two methods of casting steel reenforcement in shoes of this type. The steel lug shown at 52 in Fig. 14 connects the two portions 53 and 54 of the shoe so as to continue the shoe during its life, an integral shoe making it less expensive to handle at the plant in shipment and in service besides reenforcing it centrally, and also to enable the shoe through elasticity to rest against the brake head at its four points at both ends and at both sides of the central holding lug, thereby preventing it breaking between the ends and the centre of the shoe. In Fig. 15, however, the steel reenforcements are in two pieces 55 and 56, and this enables the old and worn halves of shoes when broken in handling and shipping to be removed and matched together, and the unbroken or remaining halves can thus be worn out.

In Fig. 18, I show a modified form of an integral interlocking cast iron brake shoe having all of the holding lugs cast on the back of the shoe 57. These lugs are indicated at 58, 59, 60, 61, and 62, and each lug is provided with a hole therethrough as indicated at 63 to receive the locking pin 64. The face of the new shoe may be grooved as indicated in Figs. 8, 9, and 10, but preferably a different type of groove is provided as indicated at 65 so that it is not necessary to use a core in forming the front groove.

The advantages of this construction shown in Figs. 18 to 20 lie particularly in the fact that no lugs are provided on the front face of the new shoe so that one type of shoe can be used for all purposes even for first application which was not true of the shoes illustrated in Figs. 8, 9, and 10. The shoe shown in Fig. 18 is more cheaply made than those with an integral steel back although the interlocking feature is still present as it was in Fig. 1.

Turning now to Figs. 21 to 23, in these figures I show a shoe 66 having a pressed steel or malleable iron back 67 which back has the two end guide lugs 68 and 69 and the central holding lug 70 as integral parts of the back. This back is molded into the back of the cast iron shoe thus eliminating the casting of the lugs with the necessary cores and making it a simpler method of molding such a shoe as well as giving a stronger construction and one more economical to manufacture than the other steel back shoes. The shoe 66 has a recess 71 provided in the front face to accommodate the central holding lug of a similar shoe. With a slot 72 cut transversely through the shoe so that two of the shoes may be pinned together in this novel fashion, suitable recesses are provided as indicated at 73 on the front face of the shoe 66 to take care of the rear lugs of the shoe locked thereto.

In Fig. 23, I show merely a reenforcement for the central lug of shoe 74, this reenforcement being indicated in dotted lines at 75 and being of much the same construction as the backing 67 in Figs. 21 and 22 with the exception that the reenforcement terminates a short distance on each side of the central lug and is completely buried in the cast iron.

In the types of reenforcement shown in Figs. 14, 15, and 23 as well as in Figs. 21 and 22, the back may be made of relatively thin soft steel and extended to hold the broken parts of the casting in place. It is not necessary that such backings be of the full breadth of the shoe to perform this purpose. Owing to the construction of this interlocking shoe to transfer the strain to the brake head, it is not necessary to employ a heavy steel backing or in fact a steel backing at all except as a matter of safety in case of breakage through faulty molding or other unexpected cause.

From the above description, it is believed that the construction and advantages of this device will be clear to those skilled in this art.

Having thus described my invention, what I claim as new and desire to secure by Letters Patent is:

1. An interlocking brake shoe structure including a brake head and two shoes pinned together, said shoes having holding lugs on their backs apertured to receive a locking pin and having corresponding sockets to receive the holding lugs of a similar shoe on their concave faces, said shoes having locking pin openings accessible to receive or release the locking pin when the back of the shoe is against the brake head, and a locking pin connecting said two shoes together.

2. A brake shoe having end holding lugs and a central holding lug on its back, the central holding lug having a keyway for the reception of a locking means to fasten the lug and shoe to a brake head, said central lug also having a keyway at its base, said brake shoe also having on its face recesses spaced to receive the end and central lugs of a similar shoe and being apertured to receive a locking pin or key through the body thereof and through the base of the central lug of a similar shoe when two shoes are placed together.

3. A brake shoe having three apertured lugs on its back, two of said lugs being at the ends of the shoe, and the third lug adjacent the center thereof, the central lug also having an aperture at its base, and said shoe also having two seats on its back between the end and central lugs, and the concave face of said shoe being provided with lugs and seats corresponding to the seats and lugs on its back, said shoe also having a guideway to receive a pin adjacent its concave face to engage the aperture at the base of a similar shoe seated thereagainst.

4. A brake shoe having end lugs and a central lug on its back, said central lug being apertured to receive a holding pin to lock the shoe to a brake head, and said central lug also having an aperture at its base, said shoe having on its face sockets corresponding to said lugs whereby two shoes may be nested together, and said shoe having a longitudinal pin seat extending from one end thereof through the central socket whereby two similar shoes may be locked longitudinally together with a pin.

5. A brake shoe having an apertured central holding lug for pinning the shoe to a brake head, said holding lug having another aperture at its base to receive a pin for pinning it to another similar shoe, the said shoe having means on its concave face for the reception of a lug and holding pin of a similar shoe.

6. A brake shoe having a plurality of apertured holding lugs on its back, the central lug of which also has an aperture at its base, said shoe having on its concave face corresponding recesses for the reception of the holding lugs of a similar shoe together with a pin receiving and holding groove in the concave face of said shoe and extending substantially the entire length thereof for the reception of a locking pin.

7. A brake shoe having a central holding lug projecting from the back thereof, said lug having an aperture for a brake head key to pin the shoe to the brake head and also having an aperture at its base for the reception of another key whereby two similar shoes may be pinned together longitudinally with the key, said shoe having a recess in its concave face for the reception of the central holding lug of a similar shoe and having a pin receiving opening extending throughout the length of its concave face to receive a locking key to lock two shoes together.

8. A brake shoe having a central holding lug projecting from the back thereof, said lug having an aperture for a brake head key to pin the shoe to the brake head and also having an aperture at its base for the reception of another key whereby two similar shoes may be pinned together longitudinally with the key, said shoe having a recess in its concave face for the reception of the central holding lug of a similar shoe and having a pin receiving opening extending throughout the length of its concave face to receive a locking key to lock two shoes together, the pin receiving opening being open to the face of the shoe throughout its length.

9. An interlocking one-piece brake shoe having lugs on its back, one of which is apertured to receive a locking pin to lock it to a brake head, said shoe having recesses in its face to receive the lugs of a similar shoe, and means for locking two similar shoes together comprising a transverse locking pin together with openings through the central lug and side walls of the shoe.

CHARLES W. ARMBRUST.